(12) United States Patent
Montorsi et al.

(10) Patent No.: US 6,975,524 B2
(45) Date of Patent: Dec. 13, 2005

(54) POWER FACTOR CONTROL DEVICE

(75) Inventors: Francesco Montorsi, Sirolo (IT); Daniele Sabbatini, Falconara Marittima (IT); Angelo Nicolini, Recanati (IT)

(73) Assignee: Roal Electronics S.p.A., Castelfidardo (IT)

( * ) Notice: Subject to any disclaimer, the term of this patent is extended or adjusted under 35 U.S.C. 154(b) by 0 days.

(21) Appl. No.: 10/937,050

(22) Filed: Sep. 9, 2004

(65) Prior Publication Data

US 2005/0088864 A1    Apr. 28, 2005

(30) Foreign Application Priority Data

Oct. 28, 2003    (IT) .......................... MI2003A2095

(51) Int. Cl.[7] .......................... H02M 7/217; G05F 1/70
(52) U.S. Cl. ........................................ 363/89; 323/207
(58) Field of Search .............................. 363/44, 81, 89, 363/125, 127; 323/205, 207

(56) References Cited

U.S. PATENT DOCUMENTS

| | | |
|---|---|---|
| 4,677,366 A | 6/1987 | Wilkinson et al. |
| 5,088,019 A | 2/1992 | Williams et al. |
| 5,103,388 A | 4/1992 | Williams et al. |
| 5,359,276 A | 10/1994 | Mammano |
| 5,631,550 A | 5/1997 | Castro et al. |
| 5,801,935 A * | 9/1998 | Sugden et al. ................. 363/89 |
| 6,154,090 A | 11/2000 | Wissmach et al. |
| 6,621,253 B2 * | 9/2003 | Mendenhall ................. 323/210 |
| 6,650,092 B1 * | 11/2003 | Lidak et al. ................. 323/207 |
| 6,903,946 B1 * | 6/2005 | Wu .............................. 363/65 |
| 2003/0161167 A1 | 8/2003 | Barnett et al. |

FOREIGN PATENT DOCUMENTS

| | | |
|---|---|---|
| EP | 0 476 278 A2 | 3/1992 |
| EP | 0 476 278 A3 | 3/1992 |

OTHER PUBLICATIONS

Batchvarov J.S. et al: "Interleaved Converters Based on Hysteresis Current Control" 31st Annual IEEE Power Electronics Specialists Conference. PESC 00, Conference Proceedings. Galway, Ireland, Jun. 18-23, 2000, vol. 2, (Jun. 18, 2000), pp. 655-661, XP010518737 *p. 655-p. 657*.

(Continued)

*Primary Examiner*—Adolf Berhane
(74) *Attorney, Agent, or Firm*—Pearne & Gordon LLP (57) ABSTRACT

A power factor correction device comprising a rectifier (10) operable to receive an AC input voltage (100) and output a rectified voltage (110), and a first analog module (20) connected to the rectifier (10) so as to receive the rectified voltage (110) and generate a corresponding first output signal (120). The device (1) also comprises a second analog module (30) connected in parallel to the first module (20) and connected to the rectifier (10) so as to receive the rectified voltage (110) and generate a corresponding second output signal (130); the output signals (120, 130) are duly combined and transmitted to a load (40) in the form of a main signal (140) that defines a main current (I) and main voltage (V) of the load (40) itself. A digital controller (50) receives the rectified voltage (110) and the main signal (140) and generates, accordingly, a command signal (150) to be transmitted to the modules (20, 30) in order to regulate the input current ($I_{In}$) of the latter and thereby obtain control over the power factor (PF) of the load (40) viewed from the network (11) while simultaneously maintaining the main voltage (V) at a preset value.

18 Claims, 5 Drawing Sheets

OTHER PUBLICATIONS

Batchvarov J.S. et al: "Wide-Bandwidth Current-Source Converter Based on Interleaved Power Modules" 8th European Conference on Power Electronics and Applications. Lausanne, CH, Sep. 7-9, 1999, EPE . European Conference on Power Electronics and Applications, Brussls : EPE Association, BE, vol. CONF.8, (Sep. 7, 1999), pp. 1-10, XP000878421 ISBN: 90-75815-04-2 * p. 3; figure 2b *.

Sangsun Kim et al.: "Control of Multiple Single Phase PFC Modules with a Single Low-Cost DSP", Feb. 9, 2003. APEC 2003, 18th Annual IEEE Applied Power Electronics Conference and Exposition, Miami Beach, FL, Feb. 9-13, 2003, Annual Applied Power Electronics Conference, New York, NY: IEEE, US, page(s) 375-381, XP010631537 ISBN: 0-7803-7768-0 *the whole document*.

Spiazzi G. et al: "Methods to Improve Dynamic Response of Power Factor Preregulators: An Overview", Sep. 19, 1995, EPE '95: 6th European Conference on Power Electronics and Applications. Sevilla, Sep. 19-21, 1995, European Conference on Power Electronics and Applications, Brussels, EPE Association, B, page(s) 3754-3759, XP000538400 *p. 3754-p. 3755; figure 1*.

* cited by examiner

POWER FACTOR CONTROL DEVICE

FIELD AND BACKGROUND OF THE INVENTION

The present invention relates to a device for controlling the power factor.

As is well known, the "power factor" in an electric load is defined as the ratio between the actual power absorbed by the load itself and the apparent power applied to it.

The power factor is strictly related to the phase displacement between the current drawn by the load and the voltage applied to the latter by the power source: if the drawn current is completely in phase with and has the same waveform as the applied voltage, the power factor will be equal to 1; if, on the other hand, voltage and current are out of phase and/or have different waveforms, the power factor will be less than 1.

A power factor with a value of 1 (or close to 1) is desirable both from an energy standpoint (energy efficiency is maximized) and for reasons tied to distortion (the voltage waveform will not be substantially distorted by the load).

In many applications it is actually not possible to achieve a power factor equal to 1; in particular, in applications such as inverters, motor control or converters for low voltage that operate from a DC bus, the power factor may be much less than 1.

The above-mentioned circuits are typically provided with a bridge rectifier and an electrolytic capacitor connected to the bus and serving to convert the AC input voltage into an adequately filtered DC voltage.

In order to improve the power factor (i.e., to increase it so as to bring it as close as possible to a value of 1), correction circuits are installed between the mains power supply network and the load. These circuits enable a sufficiently high power factor to be obtained (e.g. 0.8–0.9).

Among the power factor correction circuits available today there are systems consisting of a digital controller (typically a DSP) associated with analog power modules.

The digital controller measures all the necessary parameters relating to the supply voltage/current and output voltage/current and generates appropriate command signals that are transmitted to the power modules, so that the latter can deliver power to the load while maintaining a high power factor. Furthermore, the digital controller transmits commands to all modules at the same frequency and controls their synchronization.

A drawback of this type of circuit emerges if one considers the costs of setting it up (DSPs are notoriously expensive devices) and the need to modify the digital control whenever it is necessary to adjust maximum output power by changing the number of modules.

At the present state of the art, an alternative to the circuits briefly described above may be a completely analog-type circuit.

The operating limits of this second type of correction circuit become evident considering that for any change that needs to be made, the hardware making up the circuit itself must be adapted. Moreover, it is very difficult to implement topologies with several parallel power modules.

In other words, as the device is of a completely analog type, it is not possible to substantially modify any function without operating directly upon the electronic circuitry, replacing some components or setting them in a particular manner.

In addition to the above drawbacks, analog implementation of auxiliary control functions (relating, for example to overvoltage conditions or, more generally speaking, to situations where the system is not working correctly) is extremely complex, costly and above all offers little flexibility.

SUMMARY OF THE INVENTION

It is therefore an object of the present invention to overcome the drawbacks described above.

More particularly, it is an object of the present invention to provide a power factor control device that is capable of managing a number of output modules in a flexible but economical manner.

It is a further object of the present invention to provide a power factor control device with additional control functions, which may be easily modified and adapted according to the specific requirements of the equipment to which the device itself is connected.

These and other objects are substantially fulfilled by a power factor control device as described in the appended claims.

BRIEF DESCRIPTION OF THE DRAWINGS

Further characteristics and advantages will become apparent upon reading the detailed description of a preferred, but not exclusive embodiment of the invention. The description is provided with reference to the accompanying drawings, which are presented solely for illustrative purposes and do not limit the scope of the invention, in which.

DESCRIPTION OF THE PREFERRED EMBODIMENTS

With reference to the accompanying drawings, the number 1 is used to indicate the overall power factor control device according to the present invention.

Device 1 comprises first of all a rectifier 10, which may be connected to a power supply network 11 in order to receive an AC input voltage 100, preferably of a sinusoidal type, and supply, accordingly, a rectified output voltage 110.

The AC voltage 100 may be, for example, between 100 and 240 V; advantageously, an EMI (ElectroMagnetic Interference) suppressing filter may be installed between the power supply network 11 and rectifier 10.

Rectifier 10 may be configured as a conventional diode bridge, such as to convert the negative semiwaves of the AC voltage 100 into positive semiwaves and thereby obtain the rectified voltage 110.

The negative semiwaves of the current drawn from the power supply network 11 will likewise be converted into positive semiwaves to obtain the rectified current $I_{In}$.

The rectified voltage 110 and rectified current $I_{in}$ are supplied as input to a first analog module 20 and a second analog module 30.

The first analog module 20 (FIG. 4) is provided with an inductor L1, at one end of which is applied the aforesaid rectified voltage 110, connected to a diode D1 in such a way that the latter will allow a flow of current into a capacitor C1, called "bulk capacitor".

Figure 4:
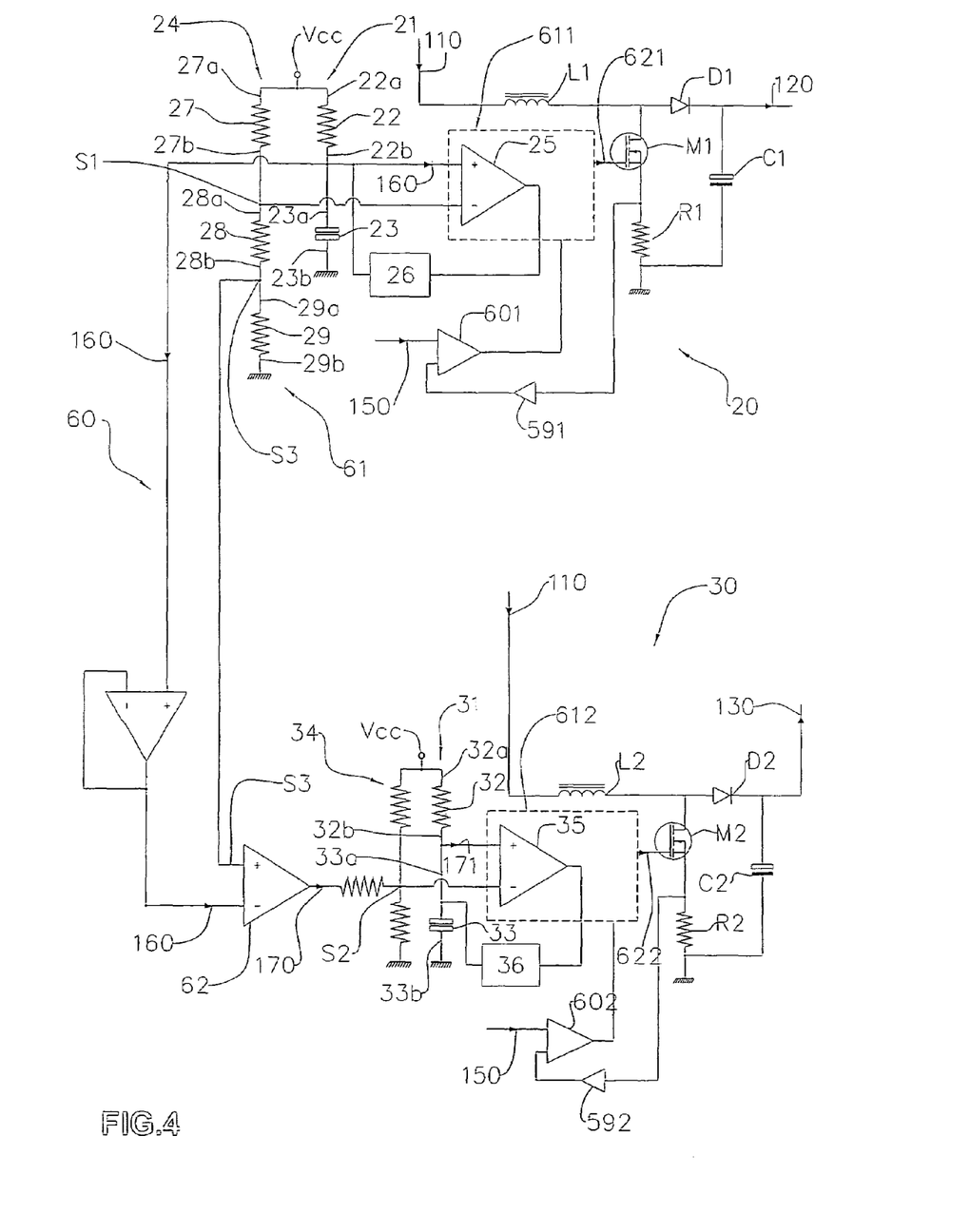
FIG. 4 shows a circuit diagram of a second functional block of the device illustrated in FIG. 1.

The drain terminal of a semiconductor device M1, which can be engineered as a MOSFET or an IGBT, is connected between inductor L1 and diode D1; the source terminal of said device is grounded via a resistor R1, generally referred to as "shunt".

A regulation signal 621 generated by a command circuit 611, whose structure will be better described below, is applied on the gate terminal of device M1.

The current flowing across shunt resistor R1 is read by a suitable sensing circuit 591 and input to a current amplifier 601; the latter also receives an input command signal 150, generated by a digital controller that will be described in detail below.

The two input signals received are compared and the current amplifier 601 generates, accordingly, a signal destined for the above-mentioned command circuit 611, thus closing a feedback loop whose purpose is to regulate the output signal 120 of the first analog module 20.

The first analog module 20 additionally comprises a first circuit branch 21 and a first resistive divider 24, connected in parallel in order to define the frequency and operating phase of the first module 20 itself.

Entering into greater detail, the first circuit branch 21 comprises a first resistor 22 having a first end 22a connected to a fixed-potential node and a second end 22b connected to the first end 23a of a first capacitor 23; the second end 23b of the first capacitor 23 is grounded.

The first resistive divider 24, similarly connected between the aforesaid fixed-potential node and ground, defines at least one level of constant voltage, which lies between the voltage of said fixed-potential node and ground; this constant voltage identifies a first threshold voltage value S1.

A comparator block 25 has a first input connected to the second end 22b of the first resistor 22 (and thus also to the first end 23a of the first capacitor 23) and a second input connected to the first divider 24; the phase reference of the first output signal 120 is derived by comparing the voltage at the second end 22b of the first resistor 22 and the first threshold value S1.

Furthermore, a first discharge circuit 26 is connected to the aforesaid first comparator block 25 and to the first capacitor 23, its purpose being to discharge the latter when the voltage at the second end 22b of the first resistor 22 is substantially equal to the first threshold value S1.

The second analog module 30, also schematically illustrated in FIG. 4, has a structure that is wholly similar to the one described above for the first module 20; the second module 30, in fact, comprises an inductor L2, at one end of which is applied the rectified voltage 110, and a diode D2, connected to inductor L2 to induce a flow of current into a bulk capacitor C2.

A semiconductor device M2 (preferably a MOSFET or IGBT) has a drain terminal connected between inductor L2 and diode D2; the source of device M2 is grounded via a shunt resistor R2.

A regulation signal 622 generated by a command circuit 612, whose structure will be better described below, is applied at the gate input of device M2.

The current flowing into resistor R2 is likewise read by a sensing circuit 592 and supplied as input to a current amplifier 602, which compares it with a command signal 150 received from the previously mentioned digital controller; the second output signal 130 delivered by the second analog module 30 is regulated on the basis of this comparison.

The second module 30 additionally comprises a second circuit branch 31, defined by a second resistor 32 and a second capacitor 33.

The second resistor 32 has a first end 32a connected to the aforesaid fixed-potential node and a second end 32b connected to the first end 33a of the second capacitor 33; the second end 33b of the second capacitor 33 is grounded.

The second module 30 is likewise provided with a second resistive divider 34, similarly connected between the fixed-potential node and ground; the second divider 34 thus identifies a second threshold value S2.

A second comparator block 35 compares the voltage at the second end 32b of the second resistor 32 with the second threshold S2, in order to generate the second output signal 130; in addition, a second discharge circuit 36 discharges the second capacitor 33 when the voltage at the second end 32b of the second resistor 32 is substantially equal to the second threshold S2.

It should be noted that since the first and second analog modules 20, 30 are connected in parallel, the first and second output signals 120, 130 will be added together to generate, accordingly, a main signal 140, applied to a load 40; across load 40 there will thus be a main voltage V, while a main current I will flow in load 40 itself.

The function of device 1 is to ensure that the current drawn from the power supply network 11 has a waveform that is as similar as possible to the waveform of the voltage from network 11, so as to maximize the power factor PF.

In order to minimize noise emission on signal 110, device 1 is provided with a synchronism block 60, which acts upon the first and second analog modules 20, 30 in such a way as to cause a reciprocal phase displacement between said first and second output signals 120, 130.

The synchronism block 60 delivers a first synchronism signal 160 to the first module 20 and a synchronism signal 170 to the second module 30 in such a way as to ensure that the second output signal 130 will be out of phase with the first output signal 120 by a prefixed amount; since there are two analog modules, this prefixed phase displacement may be conveniently set at 180°.

In this manner, the high-frequency ripple superimposed on the first and second output signals 120, 130 will tend to be canceled out at the moment in which the two signals are added, thus limiting the amplitude of disturbance in the main current I. Similarly, the high-frequency current ripple present in $I_{In}$ will tend to be canceled out.

In the case where, in general, device 1 is provided with N analog modules 200, each capable of generating a respective output signal 201 to obtain the aforesaid main signal 140, the phase displacement of each output signal 201 in relation to the first output signal 120 is defined by the relation:

$$(i/N)*360°$$

where "N" indicates the total number of analog power modules and "i" is equal to 0, 1, 2 ... N−1 and specifically identifies each module in sequence, ascribing the value i=0 to the first analog module 20.

Accordingly, taking output signal 120 of the first module 20 as the reference, there will be a module 200, which generates an output signal 201 out of phase of (1/N)*360° with the first output signal 120, another module which generates an output signal 201 out of phase of (2/N)*360° with the first output signal 120, etc., up to a last module whose output signal is $((N-1)/N)*360°$ out of phase with the first output signal 120.

By employing a temporal structure of the various output signals 201, such as the one briefly described above, it is possible to minimize the noise due to the superimposition of the various current ripples and, indeed, by determining the appropriate phase differences it is possible to exploit said superimposition in order to partly eliminate the noise.

It is clear, therefore, that the considerations made with reference solely to the first and second modules 20, 30 may be immediately extended to a circuit having a larger number of analog power modules.

Going back to the case of two modules only 20, 30, the first synchronism signal 160 is preferably defined by the voltage at the second end 22b of the first resistor 22; in other words, the first circuit branch 21 is part of synchronism block 60 and furnishes a reference to the first module 20 for the generation of the first output signal 120.

The second synchronism signal 170 acts upon the second divider 34 of the second module 30 in such a way as to vary the second threshold value S2 and thereby cause the second output signal 130 to be out of phase with the first output signal 120.

Entering into greater detail, synchronism block 60 comprises an auxiliary divider 61, which is used to generate an auxiliary threshold value S3; advantageously, auxiliary divider 61 coincides with the aforesaid first divider 24 of the first analog module 20.

The first divider 24 is thus provided with a first, second and third resistor 27, 28, 29.

The first resistor 27 has a first end 27a connected to the fixed-potential node and a second end 27b connected to the first end 28a of the second resistor 28; the second end 28b of the latter is connected to the first end 29a of the third resistor 29.

The second end 29b of the third resistor 29 is grounded.

The node identified by the second end 27b of the first resistor 27 has a voltage that defines the aforesaid first threshold value S1, whereas the voltage at the second end 28b of the second resistor 28 defines the auxiliary threshold value S3.

In practical terms, the voltage of the above-mentioned fixed-potential node is divided by means of the first, second and third resistors 27, 28, 29 so as to obtain the aforesaid threshold values S1, S3.

Once threshold values S1, S3 have been defined, an auxiliary comparator block 62 compares the auxiliary threshold value S3 with the first synchronism signal 160 in order to generate the aforementioned second synchronism signal 170 based on said comparison and obtain a change in threshold S2 accordingly. The details as regards the generation of these latter signals will become more apparent when reference is made to FIG. 5.

In order to control the operation of the aforesaid modules 20, 30 and supply the required power to the load 40 while maintaining the power factor PF at a sufficiently high level, device 1 is equipped with a digital controller 50.

Digital controller 50 is connected to the above-mentioned rectifier 10 and to the first and second analog module 20, 30 so that it may receive the rectified voltage 110 and main signal 140 as inputs and generate the output command signal 150, to be transmitted to the same modules 20, 30 for the purpose of regulating current $I_{In}$ and thereby controlling both the power factor PF and main voltage V to the load 40.

By way of example, digital controller 50 can be an 8-bit microcontroller with 10-bit A/D converter, 2.5 Kbyte Program Memory, 256 Bytes RAM, 14 general-purpose I/O and a core of at least 5MIPS.

Entering into greater detail, controller 50 comprises a first analog-digital converter 51 for measuring the main voltage V across load 40 and obtaining a corresponding first digital signal 300; the latter is essentially a digital representation of the voltage V.

Controller 50 also comprises a second analog-digital converter 52 for measuring the rectified voltage 110 and obtaining a second digital signal 310; the latter is a digital representation of the value taken on by the rectified voltage 110.

The first and second digital signal 300, 310 are input to computing means 53, which generate the above-mentioned output command signal 150; in this manner, by suitably operating on modules 20, 30, it is possible to lend current $I_{In}$ a waveform that is substantially identical to the waveform of the rectified voltage 110, so as to optimize the power factor PF.

Furthermore, via command signal 150, the main voltage V is maintained at a constant level regardless of the power demanded by the load 40.

Figure 2:
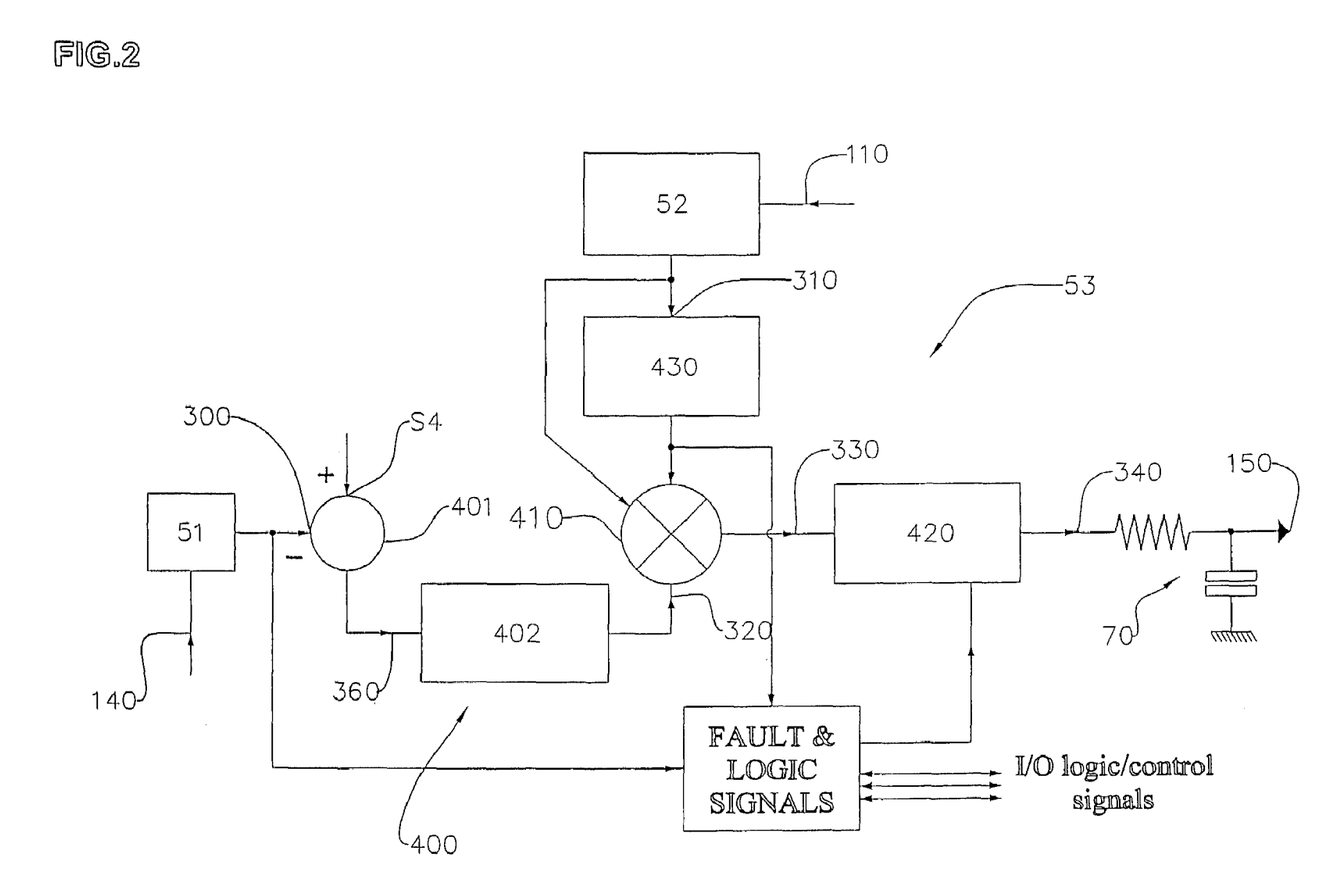
FIG. 2 shows a block diagram of a functional block of the circuit illustrated in FIG. 1.
Figure 3:
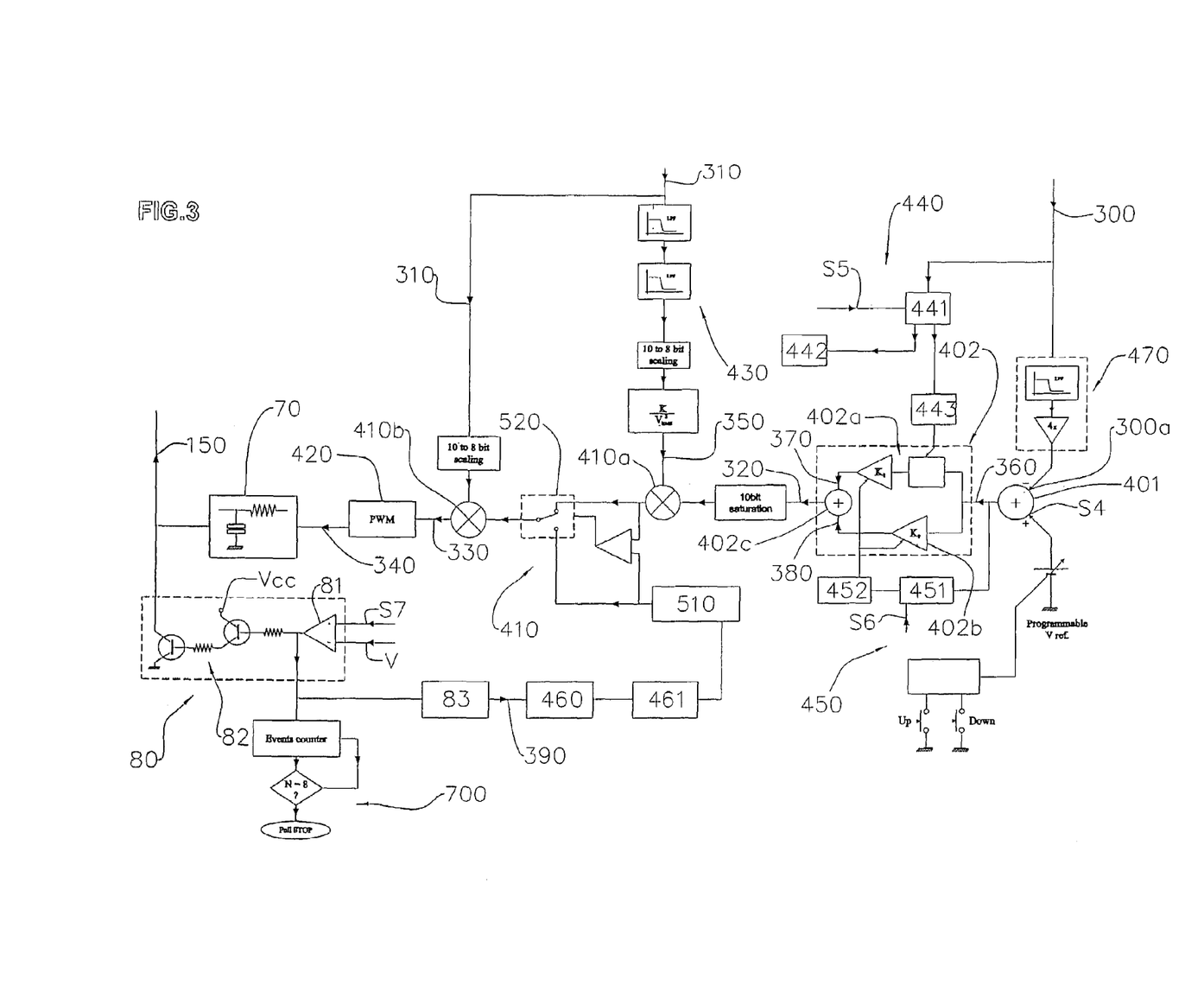
FIG. 3 shows a detailed block diagram of the functional block illustrated in FIG. 2.

As schematically illustrated in FIGS. 2 and 3, the computing means 53 are equipped with a comparator block 400, which receives the first digital input signal 300 and compares it with a pre-memorized threshold S4 to obtain an error signal 320.

In greater detail, comparator block 400 consists of a differentiating circuit 401 for determining the difference between the first digital signal 300 and the pre-memorized threshold S4; in practical terms, the difference between the value taken on by the main voltage V, numerically represented by the first digital signal 300, and the threshold S4 is determined instant by instant so as to obtain a corresponding difference signal 360, which will be used in the computations described below.

It shall be noted that the first digital signal 300, before being compared with threshold S4, can be advantageously filtered and amplified so as to obtain a corresponding secondary signal 300a.

The difference signal 360 is input to an auxiliary filter 402, connected downstream to said differentiating circuit 401.

Auxiliary filter 402 comprises integrating means 402a, which receive the difference signal 360 and output a first computed signal 370, which is proportional to an integral of the difference signal 360 itself, calculated in relation to time; the integrating means 402a can be obtained, in practice, by connecting an integrator in series with an amplifier; the latter will define the proportionality parameter by which to multiply the result of the integral in order to obtain the first computed signal 370.

Auxiliary filter 402 further comprises an amplifier 402b, which is likewise configured to receive the difference signal 360 as an input; the output of amplifier 402b consists in a second computed signal 380, directly proportional to the difference signal 360 based on a parameter defined by amplifier 402b itself.

Auxiliary filter 402 also comprises an addition circuit 402c, which receives the first and second computed signals 370, 380 as inputs and adds them together; the resulting sum is the error signal 320.

The computing means 53 further comprise a multiplier block 410; it receives as inputs the error signal 320, the second digital signal 310 and a third digital signal 350

(which will be described below) and multiplies them to generate an output signal 330 corresponding to the result of the multiplication.

The third digital signal 350 is generated by a main filter 430 from the second digital signal 310; the third digital signal 350 numerically represents the reciprocal of the square of the average quadratic value of the rectified voltage 110 represented by the second digital signal 310.

In the preferred embodiment, in order to avoid overburdening the controller 50 with computational tasks, the third digital signal 350 is calculated by referring to a pre-memorized look-up table which gives the most probable values for the rectified voltage 110, along with the respective results, rather than relying on continuous real-time calculations of the reciprocal of the square of the number represented by the second digital signal 310.

The additional use of the third multiplicative factor defined by the third digital signal 350 makes it possible to compensate for any rapid fluctuations in the supply voltage 100 without affecting the operation of the system as a whole.

It shall be noted, moreover, that in the diagram shown in FIG. 3 the multiplier block 410 is represented with two distinct multiplier nodes 410a, 410b to better illustrate the process by which the resulting signal 330 is generated (and power is accordingly delivered to the load 40).

The functional characteristics of each node 410a, 410b will become apparent from the description of the operation of device 1.

The resulting signal 330 is input to modulation means 420 which, based on signal 330 itself, output a sequence of pulses defining a square wave signal 340; more particularly, all the pulses have the same amplitude, but their duration will vary according to the information incorporated in the resulting signal 330. Preferably, the modulation means 420 consist of a PWM-type modulator.

The square wave 340 is input to an integrator block 70, connected to computing means 53, and in particular to the aforesaid modulation means 420; the integrator block 70, advantageously engineered with one or more resistors and one or more capacitors connected as shown in FIG. 3, generates the above-mentioned command signal 150 on the basis of square wave 340.

Command signal 150 is thus obtained by integrating square wave 340 generated by PWM 420; therefore, command signal 150 has an amplitude proportional to the duty cycle of square wave 340 itself.

In order to ensure the correct functioning of device 1 and any other equipment connected thereto, device 1 itself is endowed with a first control circuit 440.

The first control circuit 440 comprises comparator means 441 that compare the first digital signal 300 with a first auxiliary threshold S5, which represents a working limit for device 1; i.e. the first auxiliary threshold S5 indicates a maximum value for the main voltage V, a limit that must not be surpassed to prevent system faults or malfunctioning.

Should the first digital signal 300 be higher than the first auxiliary threshold S5, shutdown means 442 will intervene to shut down the analog modules 20, 30 and thus cut off the supply of power to the load 40, as a problem is likely to have occurred within the circuit; furthermore, again in the event that the main voltage V, represented by the first digital signal 300, exceeds the first auxiliary threshold S5, discharge means 443 will at least partly discharge the integrating means 402a of auxiliary filter 402.

Said discharge, which may fixed, for example, at 12.5% of the total charge, advantageously enables a faster recovery from the overvoltage situation, i.e. it permits the normal operating conditions of device 1 to be restored more quickly.

Advantageously, the shutting down of modules 20, 30 by shutdown means 442 can be achieved by forcing the duty cycle of PWM 420 to zero.

It shall be noted that the control function provided by the aforesaid first circuit 440 is a software-based control function performed by controller 50 according to numbers received as inputs in a digital format.

It is likewise envisaged that the computing means 53 will comprise a second control circuit 450 serving to provide control over the main voltage V.

The second control circuit 450 is provided with comparator means 451 whose function is to compare the main voltage V with a second auxiliary threshold S6 and to determine in particular whether the main voltage V is lower than said threshold; if such is the case, a correction block 452 will intervene to increase the first proportionality parameter of the aforesaid integrating means 402a and/or the second proportionality parameter of the aforesaid amplifier 402b, according to the difference between the main voltage V and second auxiliary threshold S6.

In practical terms, the control function of the second circuit 450 may be performed directly on the first digital signal 300, representing the main voltage V, or, in a wholly equivalent manner, on the difference signal 360 generated by the differentiating circuit 401; needless to say, in each of these two cases the second auxiliary threshold S6 must be set accordingly.

This control function is useful in that it enables the normal operating conditions of device 1 to be restored more quickly after a voltage drop below the preset limit.

An additional control function is performed by a third control circuit 80, of the analog type, comprising comparator means 81 whose function is to compare the main voltage V with a third auxiliary threshold S7 (advantageously selected so as to be greater than or equal to the first auxiliary threshold S5) and a command block 82 for shutting down the first and second modules 20, 30 in the event that the main voltage V exceeds the third threshold S7.

Furthermore, a transmission block 83 is connected to the comparator means 81 so that an alarm signal 390 may be sent to the computing means 53 in the event that the main voltage V exceeds the third threshold S7.

The computing means 53 are thus equipped with receiving means 460 for receiving the alarm signal 390 and a restart block 461, whose function is to make a preset number of attempts to restart the analog modules 20, 30 previously shut down by the above-mentioned command means 82; an event counter 700 keeps track of the number of attempts made and on reaching a certain limit (e.g. 8 attempts) causes modules 20, 30 to shut down permanently. At this point, in order to re-enable their operation it will be necessary to disconnect the system from the power supply for a preset time interval and then reconnect it to the power supply.

In practical terms, the third control circuit 80 carries out a hardware check on the value of the main voltage V; being an analog-type function, the check can take place even if controller 50 breaks down and interrupts its computing activity.

If the main voltage V effectively proves to be higher than the third auxiliary threshold S7, the current reference generated by controller 50 is short circuited to earth, thus preventing analog modules 20, 30 from receiving the command signal 150 and, consequently, from supplying power to the load 40.

Figure 1:
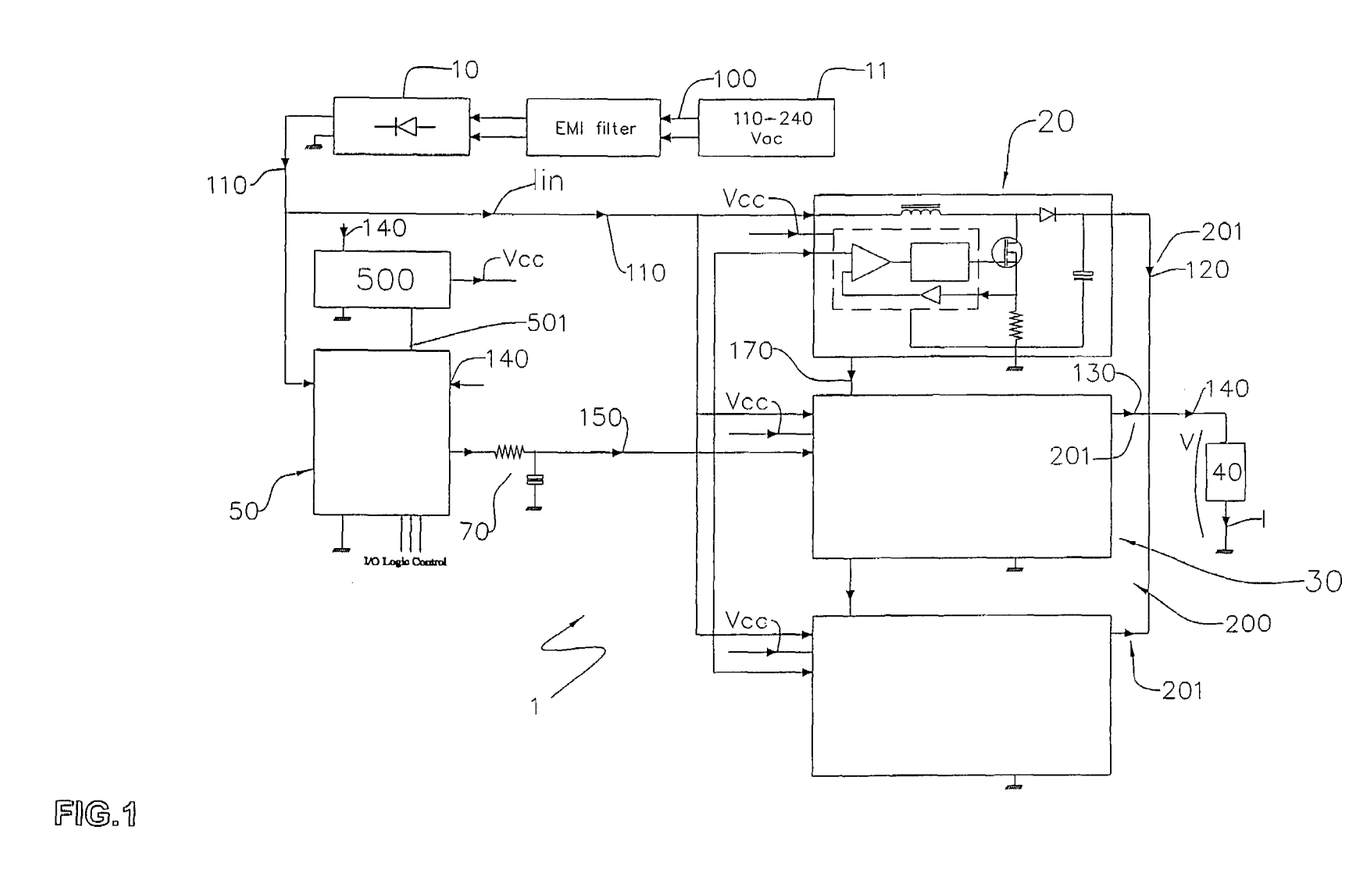
FIG. 1 shows a general block diagram of a device according to the present invention.

As shown in FIG. 1, device 1 is also equipped with an auxiliary power unit 500; the latter receives the main input voltage V and outputs a first supply voltage 501 (e.g. 3 or 5 V) for the digital controller 50 and a second supply voltage Vdc (for example 12V) destined for analog modules 20, 30, also used to define the voltage of the above-mentioned fixed-potential node to which circuit branches 21, 31 and dividers 24, 34 are connected.

In addition to the above, controller 50 may be provided with an I/O interface for the exchange of data with equipment external to device 1, for example for the purpose of running further checks on the operating conditions of the system in which device 1 is installed.

It is important to emphasize, with regard to controller 50, that the various functional blocks described above are mere representations of the functions of controller 50 itself and do not identify concrete circuit blocks physically present in device 1; in other words, the aforesaid blocks (schematically illustrated in FIG. 3) serve to illustrate how the software loaded in controller 50 enables the latter to work.

As regards the operation of device 1, the following should be noted.

When the device is installed between the power supply network 11 and load 40, the rectified voltage 110 is supplied directly to load 40 itself through inductors L1, L2 and diodes D1, D2, given that the power factor (PF) control activity has not yet started and devices M1, M2 are disabled.

The main voltage V, which at this point is essentially equal to the peak of the rectified voltage 110, is brought back to controller 50, which activates the regulation procedures.

The main voltage V, expressed via the first digital signal 300 and filtered by a digital filter 470, is compared with reference S4 and error signal 320 is obtained by means of the functional blocks described above; it may be noted that functional blocks 401, 402, 470 define a system for controlling the main voltage V.

In order to obtain a good power factor PF (i.e. a power factor sufficiently close to 1), the passband of the system for controlling the voltage V should not exceed 10 Hz. For this purpose it would be sufficient to sample the main voltage V at frequencies ranging from 100 to 200 Hz. However, the main voltage V is sampled here at a frequency of 1.2–1.5 KHz; in fact, as is well known, the oversampling of a limited-band signal, followed by digital filtering, allows an increase in resolution of ½ bit for every doubling of the sampling frequency.

In device 1, the application of this principle brings a triple advantage:
- timely information regarding the instantaneous value of the main voltage V can be sent to the first control circuit 440, enabling the latter to carry out its functions within the allowed time limits;
- since signal 300a amplified by a factor of four is sent to comparator 401 through digital filter 470 with a passband of 10 Hz, the precision in the control of the main voltage V is increased by a factor of four, because the gain of the main voltage V control loop has increased by the same amount.
- comparing the secondary signal 300a with a reference S4, likewise amplified by a factor of four in relation to what would have been required, allows greater accuracy in setting the reference value and thus that of the main voltage V.

The rectified voltage 110 is simultaneously sampled at a frequency of about 20 KHz to obtain the second digital signal 310; the third digital signal 350 is derived from the latter, through the main filter 430 described above, and is multiplied with the error signal 320 from the first multiplier node 410a.

At the starting point, the output of the first multiplier node 410a is compared instant by instant with a ramp generated by generator 510; switch 520 is thus controlled on the basis of said comparison.

More particularly, whenever the value of the ramp proves to be lower than the output of the first node 410a, the switch is placed in a first condition in which it connects the output of the ramp generator 510 with the second multiplier node 410b; whenever the value of the ramp exceeds the first multiplier node 410a, switch 520 is placed in a second condition in which it connects the output of the first multiplier node 410a with an input of the second multiplier node 410b.

In this manner it will be possible to obtain a "soft start", i.e. a gradual activation of the modulation means 420 and analog modules 20, 30.

The second multiplier node 410b then multiplies the second digital signal 310 and the signal selected by switch 520 to obtain the resulting signal 330.

In practical terms, therefore, the resulting signal 330 is defined, unless a proportionality factor is introduced, as the product of the main voltage V, rectified voltage 110 and reciprocal of the square of the average value of the rectified voltage 110.

The resulting signal 330 causes the modulation means 420 to generate a square wave 340, preferably according to the PWM technique; in particular, in light of the above description, it is evident that if the value of the main voltage V is very far from the reference value represented by threshold S4, the duty cycle of the PWM will be very great. If, on the contrary, the value of the main voltage V is fairly close to the preset threshold, the duty cycle of the PWM will be smaller.

The second digital signal 310 (i.e. the digital representation of the rectified voltage 110) fed to the input of multiplier block 410 makes it possible to precisely define the waveform that must be assumed by current $I_{In}$; in fact, since the above-mentioned input current $I_{In}$ and rectified voltage 110 are required to have the same waveform, the presence of a substantially resistive load is simulated downstream from rectifier 10, which brings the power factor PF to values approaching one.

Square wave 340 is converted into command signal 150 by integrator block 70; command signal 150 is an analog signal whose amplitude is proportional to the area defined by the pulses of square wave 340.

In other words, the amplitude of command signal 150 is proportional to the duty cycle of square wave 340.

As noted previously, the command signal is transmitted to analog modules 20, 30.

With regard to the first analog module 20, command signal 150 is received by current amplifier 601; the latter compares command signal 150 (which represents the optimal current) with the current measured by circuit 591.

Based on this comparison, and hence on the difference between the two currents, an appropriate signal is sent to the command circuit 611; the latter in turn generates a signal 621 that activates device M1 according to the PWM technique, with a variable duty cycle such as to cancel out the difference between the current set by the command signal 150 and the current measured by circuit 591.

In this manner it is possible to operate directly on input current $I_{In}$ to ensure that the waveform of the latter reflects the waveform of the rectified voltage 100 as closely as possible.

Command circuit 611 can also generate the first synchronism signal 160 and receives the first threshold value S1.

More particularly, as regards the first synchronism signal 160, the first capacitor 23 is charged via the first resistor 21, as the latter is connected to the fixed-potential node Vdc.

When the voltage in the first capacitor 23 becomes essentially equal to voltage S1 defined by the first divider 24, the first comparator block 25 switches on the first discharge block 26, which rapidly discharges the first capacitor 23.

Figure 5:
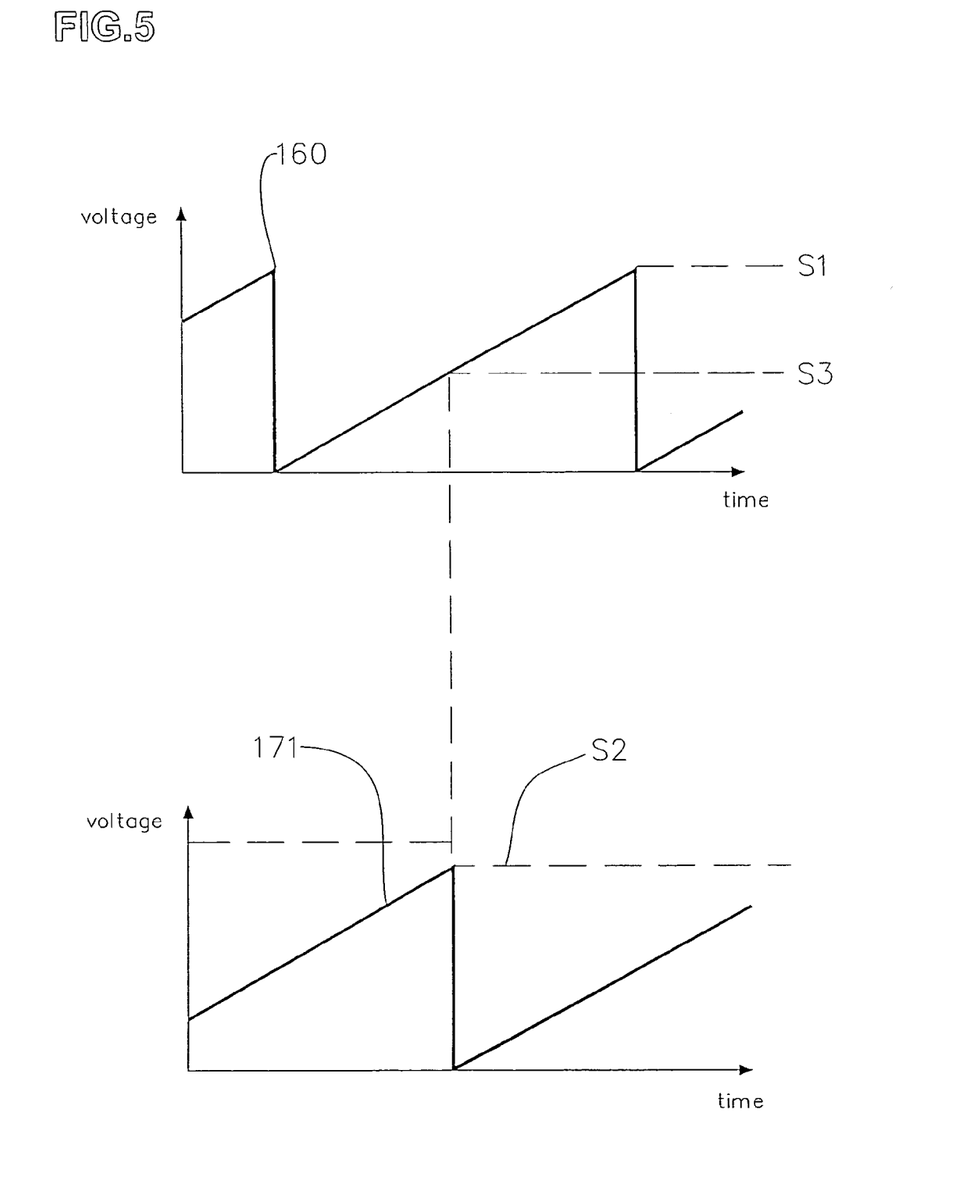
FIG. 5 shows waveforms of electrical parameters of the functional block illustrated in FIG. 4.

As a result, the first synchronism signal 160 displays a sawtooth pattern as illustrated in FIG. 5.

The first synchronism signal 160 that can be generated by command circuit 611 defines the frequency of oscillation of the PWM included in said command circuit 611, which in turn identifies the frequency with which device M1 is turned on and off for the regulation of the first output signal 120.

The second analog module 30 functions in a wholly identical manner; the only difference lies in the method by which the second threshold S2 is defined.

In fact, the second circuit branch 31 and second divider 34, together with the second comparator block 35 and second discharge circuit 36, generate a sawtooth-patterned signal 171 that is similar in every respect to the first synchronism signal 160.

The second threshold S2 is fixed via synchronism block 60, and specifically by means of auxiliary comparator block 62, in such a manner as to introduce a preset phase lag between the first output signal 120 and the second output signal 130.

In fact, the auxiliary comparator block 62 compares the first synchronism signal 160 with the auxiliary threshold value S3 defined by auxiliary divider 61; when the first synchronism signal 160 is essentially equal to said threshold S3, the second threshold S2 is lowered accordingly and the second capacitor 33 is discharged, determining the start of a new period in the sawtooth wave of auxiliary signal 171, which is the signal that defines the oscillation frequency and phase displacement in relation to the first synchronism signal 160 of the PWM incorporated in the aforesaid second command circuit 612.

FIG. 5 schematically illustrates how the second threshold S2 is lowered and auxiliary signal 171 is accordingly brought to a value of zero when the synchronism signal 160 reaches the value S3.

The lowering of the second threshold S2, caused by the second synchronism signal 170, will preferably be proportional at least to the difference between the frequency of first synchronism signal 160 and the initial frequency defined by components 32, 33 of the second analog module 30.

As noted previously, in the present case, where only two analog modules are taken into consideration, the optimal phase difference between the first and second output signal 120, 130 is equal to 180°, whereas in the case of a larger number of modules, the general expression for defining the phase lag of each output signal in relation to the first output signal 120 is the following:

$$(i/N)*360°$$

where "N" is the total number of analog power modules and "i" is equal to 0, 1, 2, . . . , N−1 and specifically identifies each module in sequence, the value i=0 being ascribed to the first analog module 20.

In configurations with more than two power modules, the auxiliary divider 61 would obviously be provided with a larger number of resistors connected in series; more specifically, auxiliary divider 61 comprises a number of resistors equal to N+1, where N is the total number of modules. Via N+1 resistors it is in fact possible to identify N reference thresholds, to be used to define the phase displacements between the various output signals.

The decision to introduce additional analog modules 200 will depend on output requirements; in fact, using power modules capable of supplying, for example, 800–1000 W each and connecting them in parallel will enable the various contributions to be added in order to obtain the desired power.

In addition to the above considerations, it should be noted that the operating frequency of the second analog module 30 (and any other modules 200) controlled by components 32 and 33 is initially slightly less (by about 10%) than the operating frequency of the first module 20; this permits the second module 30 to be correctly synchronized by module 20 and thereafter brought to the same working frequency.

The invention provides some important advantages:

First of all, the device according to the invention can be used to correct the power factor of a load and control a plurality of analog power modules in an economical, flexible and dynamic manner.

Moreover, thanks to the modular structure of the output stage, it is possible to regulate the quantity of power to be supplied to the load without having to change essentially anything in the digital control part.

Furthermore, by virtue of the particular solutions adopted, the device according to the invention features a plurality of control functions, which enable the device itself to operate in a precise and reliable manner even in the event of abrupt variations in the supply voltage or in the entity of the load.

More particularly, the main voltage-V is maintained at a constant level with good accuracy and precision during operation of the device; said main voltage V is also fixed in a significantly uniform manner in several distinct devices configured as described above.

In addition to the above advantages, the aforementioned control circuits (and specifically the events counter 700 and the functional blocks associated with it) make it possible to limit the number of system restart attempts in case of a serious fault, triggering a permanent system shutdown.

What is claimed is:

1. A power factor correction device comprising:
   a rectifier (10) that may be connected to an AC power supply network (11) so as to receive an AC input voltage (100) and supply a rectified output voltage (110);
   a first analog module (20) connected to said rectifier (10) so as to receive said rectified voltage (110) and generate a corresponding first output signal (120);
   a second analog module (30) connected in parallel to said first module (20) and connected to said rectifier (10) so as to receive said rectified voltage (110) and generate a corresponding second output signal (130), said first and second output signals (120, 130) being combined to obtain a main signal (140), destined for a load (40) and defining a main voltage (V) of said load (40) and an input current ($I_{In}$) absorbed by said rectifier (10).
   a digital controller (50) connected to said rectifier (10) and to said first and second modules (20, 30) so as to receive as input said rectified voltage (110) and said main signal (140) and generate, accordingly, a command signal (150) to be transmitted to said first and second modules (20, 30) for the purpose of regulating at least said input current ($I_{In}$) and thereby obtaining control over the power factor (PF) of said load (40).

2. The device of claim 1 wherein said first module (20) comprises:
- a first circuit branch (21) provided with:
    - a first resistor (22) having a first end (22a) connected to a fixed-potential node and a second end (22b);
    - a first capacitor (23) having a first end (23a) connected to the second end (22b) of said first resistor (22) and a second end (23b) that is grounded;
- a first resistive divider (24) connected between a fixed-potential node and ground, serving to define at least a first threshold voltage value (S1);
- a first comparator block (25) connected to the second end (22b) of said first resistor (22) and said first divider (24), serving to compare a voltage at the second end (22b) of said first resistor (22) with said first threshold value (S1) and define a frequency of said first output signal (120) based on said comparison;
- a first discharge circuit (26) associated with said comparator block (25), serving to discharge said first capacitor (23) when the voltage at the second end (22b) of said first resistor (22) and said first threshold value (S1) are substantially equal.

3. The device of claim 1 wherein said second module (30) comprises:
- a second circuit branch (31) provided with:
    - a second resistor (32) having a first end (32a) connected to a fixed-potential node and a second end (32b);
    - a second capacitor (33) having a first end (33a) connected to the second end (32b) of said first resistor (32) and a second end (33b) grounded;
- a second resistive divider (34) connected between a fixed-potential node and ground, serving to define at least a second threshold voltage value (S2);
- a second comparator block (35) connected to the second end (32b) of said second resistor (32) and to said second divider (34), serving to compare a voltage at the second end (32b) of said second resistor (32) with said second threshold value (S2) and define a frequency of said second output signal (130) based on said comparison;
- a second discharge circuit (36) associated with said second comparator block (35), serving to discharge said second capacitor (33) when the voltage at the second end (32b) of said second resistor (32) and said second threshold value (S2) are substantially equal.

4. The device of claim 1, further comprising a synchronism block (60) for generating at least a first synchronism output signal (160) destined for said first module (20) and a second synchronism output signal (170) destined for said second module (30), so as to selectively regulate the operation of said first and second analog modules (20, 30), and impose on said second output signal (130) a phase lag of prefixed entity in relation to said first output signal (120).

5. The device of claim 4 wherein said second synchronism signal (170) acts upon said second divider (34) in order to vary said second threshold value (S2) and define a reciprocal phase displacement of said first and second output signals (120, 130).

6. The device of claim 5 wherein said synchronism block (60) comprises:
- an auxiliary divider (61) for generating at least an auxiliary threshold value (S3);
- an auxiliary comparator block (62) for comparing said auxiliary threshold value (S3) and said first synchronism signal (160) so as to generate said second synchronism signal (170) based on said comparison.

7. The device of claim 6 wherein said synchronism block (60) comprises said first circuit branch (21), said first synchronism signal (160) being defined by the voltage at the second end (22b) of said first resistor (22).

8. The device of claim 6 wherein said auxiliary divider (61) is defined by said first divider (24), the latter being provided with:
- a first resistor (27) having a first end (27a) connected to said fixed-potential node and a second end (27b);
- a second resistor (28) having a first end (28a) connected to the second end (27b) of said first resistor (27) and a second end (28b);
- a third resistor (29) having a first end (29a) connected to the second end (28b) of said second resistor (28) and a second end (29b) that is grounded the voltage at the second end (27b) of said first resistor (27) defining said first threshold value (S1), the voltage at the second end (28b) of said second resistor (28) defining said auxiliary threshold value (S3).

9. The device of claim 1, further comprising a plurality of analog modules (200) connected in parallel, each of said modules being connected to said rectifier (10) in order to receive said rectified voltage (110) as input and generate a corresponding output signal (201), said output signals (201) being combined to obtain said main signal (140), each of said output signals (201) being out of phase with said first output signal (120) by an amount that is inversely proportional to the number of said modules (200).

10. The device of claim 1 wherein said digital controller (50) comprises:
- a first analog-digital converter (51) for measuring said main voltage (V) and obtaining a corresponding first digital signal (300) which represents said main voltage (V);
- a second analog-digital converter (52) for measuring said rectified voltage (110) and obtaining a corresponding second digital signal (310) which represents said rectified voltage (110);
- computing means (53) which receive said first and second digital signals (300, 310) and output said command signal (150) in order to lend said input current ($I_{In}$) a waveform that is substantially equal to the waveform of said rectified voltage (110) and an amplitude being a function of said main voltage (V).

11. The device of claim 10 wherein said computing means (53) comprise:
- a comparator block (400) for comparing said first digital signal (300) with a pre-memorized threshold (S4) and obtaining an error signal (320) accordingly;
- a multiplier block (410) for multiplying said error signal (320) and said second digital signal (310) to obtain a corresponding resulting signal (330);
- modulation means (420) connected to said multiplier block (410) so as to receive said resulting signal (330) and generate a sequence of output pulses defining a square wave signal (340), the duration of each being a function of said resulting signal (330).

12. The device of claim 11, further comprising an integrator block (70) connected to said computing means (53) so as to receive said square wave signal (340) and generate and output said command signal (150).

13. The device of claim 11 wherein said computing means (53) further comprise a main filter (430) that receives as input said second digital signal (310) and generates a third digital output signal (350) representing a reciprocal of the square of an average value of said rectified voltage (110), destined for said multiplier block (410), said resulting signal (330) deriving from the product of said second digital signal (310), error signal (320) and third digital signal (350).

14. The device of claim 11 wherein said comparator block (400) comprises:
   a differentiating circuit (401) for determining the difference between said first digital signal (300) and said pre-memorized threshold (S4), thereby obtaining a corresponding signal difference (360);
   an auxiliary filter (402) placed between said differentiating circuit (401) and said multiplier block (410) and provided with:
      integrating means (402a) for receiving said signal difference (360) and generating a corresponding first computed signal (370) proportional to an integral of said signal difference (360), computed on the basis of a first proportionality parameter;
      an amplifier (402b) for receiving said signal difference (360) and generating a corresponding second computed signal (380) proportional to said signal difference (360), computed on the basis of a second proportionality parameter;
      an adding circuit (402c) for adding together said first and second computed signal (370, 380) to obtain said error signal (320).

15. The device of claim 14 wherein said computing means (53) further comprise a first control circuit (440) provided with:
   comparator means (441) for determining whether said first digital signal (300) is greater than a first auxiliary threshold (S5);
   shutdown means (442) for shutting down said analog modules (20, 30);
   discharge means (443) for at least partially discharging the integrating means (402a) of said auxiliary filter (402).

16. The device of claim 14 wherein said computing means (53) further comprise a second control circuit (450) provided with:
   comparator means (451) for determining whether said main voltage (V) is lower than a second auxiliary threshold (S6);
   a correction block (452) that acts upon said integrating means (402a) and said amplifier (402b) of said auxiliary filter (402) in order to increase said first or second proportionality parameter based on the difference between said main voltage (V) and said second auxiliary threshold (S6).

17. The device of claim 10, further comprising a third control circuit (80) provided with:
   comparator means (81) for comparing said main voltage (V) with a third auxiliary threshold (S7), the latter being greater than or equal to said first auxiliary threshold (S5);
   a command block (82) connected to said comparator means (81) and serving to shut down said first and second modules (20, 30) in the event that said main voltage (V) proves to be greater than said third auxiliary threshold (S7);
   a transmission block (83) connected to said comparator means (81) and serving to send an alarm signal (390) to said computing means (53) in the event that said main voltage (V) proves to be greater than said third auxiliary threshold (S7).

18. The device of claim 17 wherein said computing means (53) further comprise:
   receiving means (460) for receiving said alarm signal (390);
   a restart block (461) for making a preset number of attempts to start said analog modules (20, 30) after a shutdown triggered by said command means (82).

* * * * *